United States Patent
Baentsch et al.

(10) Patent No.: US 6,496,910 B1
(45) Date of Patent: Dec. 17, 2002

(54) METHOD AND DEVICE FOR LOADING INSTRUCTION CODES TO A MEMORY AND LINKING SAID INSTRUCTION CODES

(75) Inventors: Michael Baentsch, Langnau; Peter Buhler, Thalwil; Thomas Eirich, Au; Frank Hoering; Marcus Oestreicher, both of Zurich, all of (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/326,175

(22) Filed: Jun. 4, 1999

(30) Foreign Application Priority Data

Jun. 5, 1998 (EP) .............................................. 98110359

(51) Int. Cl.⁷ .............................................. G06F 12/00
(52) U.S. Cl. ...................... 711/165; 711/103; 711/104; 711/127; 711/157; 711/220
(58) Field of Search ................................. 711/165, 103, 711/104, 127, 157, 214, 215, 220

(56) References Cited

U.S. PATENT DOCUMENTS

| 5,822,787 A | * 10/1998 | Zucker ......................... 711/213 |
| 5,991,399 A | * 11/1999 | Graunke et al. ................ 380/4 |
| 6,029,000 A | * 2/2000 | Woolsey et al. ............ 395/705 |

\* cited by examiner

*Primary Examiner*—Matthew Kim
*Assistant Examiner*—Matthew D. Anderson
(74) *Attorney, Agent, or Firm*—Louis P. Herzberg; Anne Vachon Dougherty

(57) ABSTRACT

A method for loading instruction codes to a first memory and linking said instruction codes is proposed, whereby at least one instruction code has as parameter an address which during a loading step is not determined. This address-parametered instruction code has assigned thereto an address place. A relocation information is loaded which during a linking step effects that the address becomes determined using a starting address and a relative address offset. The then determined address is put at the address place. During the loading step, directly after loading each address-parametered instruction code with its address place, the relocation information is loaded and the address is determined in the linking step.

25 Claims, 2 Drawing Sheets

| naidid | | | 28 |
|---|---|---|---|
| aid1id | Ln | aid1id | 61 |
| aid2id | Ln | aid2id | 62 |
| aid3id | Ln | aid3id | 63 |
| cl1 | | | 37 |
| inc | a | | 30 |
| call | os | | 31 |
| reloc | ars | | 35 |
| cl2 | | | 38 |
| dec | b | | 32 |
| call | os | | 33 |
| reloc | symb | aid2id | 36 |

(27 brackets rows 61, 62, 63)

METHOD AND DEVICE FOR LOADING INSTRUCTION CODES TO A MEMORY AND LINKING SAID INSTRUCTION CODES

FIELD OF THE INVENTION

The invention relates to a method and a device for loading instruction codes to a memory and linking said instruction codes. More particularly the invention relates to a combined loading and linking method in a resource-constrained environment such as a smartcard, particularly a smartcard offering a Java environment, such as a Javacard.

BACKGROUND OF THE INVENTION

When loading and linking machine-dependent, size-efficient code for execution in any resource-constrained code execution environment, in all settings where only parts of the overall executable object code are present during compilation, it is necessary to perform a final step of relocation or ling in which as yet unresolved references to external symbols, e.g., functions, variables, or classes, are replaced by actual addresses valid only in the particular execution context. The linkage information is kept separate from the code in the systems where this approach to code development and installation is commonly used, e.g., personal computers, workstations, or cross-development environments for embedded systems.

In environments, where the resources of computing time, communication bandwidth, and transient memory (RAM) are scarce, and where in addition, writing to persistent memory is much more expensive than writing to temporary memory, and where finally no assumptions about the integrity of the communications infrastructure can be made, new problems appear. In particular, time-efficient ways are to be found to load the code and linkage information into the runtime environment in a secure manner ensuring confidentiality and integrity of the data loaded.

The initial setting where these assumptions hold true, are smartcards that are to be updated after they have been issued to the customer. In particular, multifunction cards or JavaCards need an efficient resolution of this issue. Therefore, the term 'JavaCard' is used in the following sections inclusively, but not exclusively to denote environments of the nature outlined above.

The first problem is the overall time required to load code and linkage information into the smartcard, perform cryptographic decryption and integrity checks on the smartcard over the loaded data, and finally relocate the newly loaded code to prepare it for execution. The second major issue is the amount of temporary data requited to perform the above operations.

In conventional systems, the relocation information comprises a fix-up information and an address information. The fix-up information points to the address place after an instruction code, which instruction code has an address as a parameter to be determined during linking. The address information contains an offset and a package ID, in the case where the relocation type indicates that the address lies in a package different from the package where the address-parametered instruction code lies. A package id (also called "AID"), serves as the denominator for the starting address, hence designating a package whose starting address is to be used. In the case when the package wherein the address is located is the same package as where the address-parametered instruction code lies, the starting address is already known as the starting address of this package. The address is then determined as the starting address plus the offset. Taking the peculiarities and limitations of smart cards into account, the following basic steps are thus performed to load new executable code into a JavaCard:

Receive the code into a RAM and transfer it to a persistent memory, e.g. an EEPROM.

Receive the linkage information (fix-up information and relocation tables) into the RAM and transfer it to persistent memory.

Optionally, perform decryption and cryptographic integrity checks, commonly known as MACing, of code and linkage information.

valuate the linkage information and, for each relocation entry, determine the fix-up address and according to the relocation type, compute the actual reference address and write this reference into the appropriate fix-up address in the persistent memory.

Remove the linkage information from the persistent memory to make room for further code to be loaded in the future.

This approach however, has the drawback that by performing the cryptographic operations after all data has been loaded, an inefficient number of memory copy operations has to be executed, as those operations can only be run efficiently in RAM.

By placing linkage information into persistent memory, mainly for reasons of ease of decryption and MACing purposes, a big performance penalty has to be paid, as this data has to be deleted afterwards anyway, which in itself is another expensive write operation on persistent memory.

By performing relocation after the complete code has been loaded into persistent memory, another performance penalty is incurred, since writing single bytes to persistent memory is as expensive in terms of time as writing several bytes, namely a page.

It is an object of the invention to provide a method and a device for loading instruction codes to a memory and linking said instruction codes, which takes fewer writing cycles to a memory with a relatively high write-access time. This includes the advantage that the result of a completely loaded and linked instruction code sequence is achievable aster and that the lifetime of the device is extended since due to a limited rewritability, the number of write accesses to the same memory is limited also. The effect is further improved by exploiting the effect that a write cycle to an EEPROM for 1 byte takes the same time as does a write cycle for several bytes, i.e. an EEPROM page, e.g. 64 bytes. During the conventional linking procedure, each linking step for each address needs one memory write-access, which with view to the above fact is a waste of access time. The invention exploits to a much higher degree the writing capability of each write-cycle. To this adds that an eventual decryption, using a streaming cipher and/or integrity-check can be performed also without prior writing to the EEPROM.

Furthermore, it is an object of the invention that the amount of data needed for achieving the linking is reduced in size. The amount of data to be sent to the execution environment is smaller as compared to a format where code and relocation information is not interleaved, but strictly separated. In a setting, where first the code and afterwards the relocation information is sent, it is necessary to add to each relocation entry the information for which code address the respective relocation information is valid. This so-called fix-up information is completely made obsolete by the method presented in this disclosure. Net result is a significant reduction in the amount of data sent to the execution environment, in turn leading to a reduction of the overall time necessary to execute the upload process, significantly so, if the communications speed to the execution environment is low.

Another object of the invention is to provide distinction information enabling a distinction between the instruction codes and the relocation information facilitates access to the relocation information. Using code length information which is loaded before each set of code containing the address-parametered instruction code is advantageous since immediate information is accessible for recognizing the relocation information. Furthermore the code length information can then be erased, respectively overwritten during the lining process which again saves memory space.

Still another object of the invention comprises locating the relative address offset at the address place during the loading step saves memory space because the address place is loaded as a reserved space and is only filled up with insignificant content such as zero values which take up the same space as does the address place filled with the offset value. It proves of advantage when, in the case when the address to be determined is located in a package which is different from the package location of the address-parametered instruction code, the starting address is derived from a directly addressable starting address list, such that the usually relatively long AIDs are then only stored one time and are reduced to less space-wasting addresses. Memory space is saved when the relocation information and eventual distinction information after the linking step using said relocation information is overwritten by shifting the subsequent instruction codes.

A final object of the invention is to provide a first memory where the instruction codes are loaded to and where the linking is done, preferably has a short write-access-time, such as a RAM which provides for a fast loading and linking procedure. When afterwards the instruction codes are written to a second memory with a longer write-access-time, such as an EEPROM, the usually bigger space of the EEPROM is used to store the whole linked code and the increased write-access time is then no disadvantage since the linking and eventual decryption and integrity-verification already have been performed.

SUMMARY OF THE INVENTION

A device and method for loading code via a simple protocol into a resource-constrained environment, verifying its integrity using cryptographic methods, and relocating the code to transform it into a form actually fit for immediate execution in the above environment, is proposed. The proposed method minimizes the amount of both decryption and memory-write operations required to ensure a safe transfer and installation of code.

The main idea consists of interspersing relocation information directly into the code itself and to not cleanly separate these two components. In addition, the presented load format can also efficiently be secured by cryptographic encryption and integrity protection means which can still be checked in extremely resource-constrained execution environments.

Using a cipher which can be streamed (i.e., which during decryption and MACing only relies on a few bytes of information gathered from processing previous encrypted data and never relies on information only present further forward in the encrypted data stream) enables piecewise decryption which can then be combined with integrity check and linking.

The invention uses the principle to immediately act upon the linkage information as long as it still resides in RAM and not transfer it to persistent memory until the code is linked. This becomes possible even in a secure manner, once a streaming cipher as suggested above is used. Interweaving code and linkage information in a manner that the relocation can immediately be performed in RAM, results in only filly relocated code segments needing to be written into persistent memory, i.e., EEPROM and provides that subsequent writes of single bytes at the fix-up addresses are completely removed.

The proposed solution is hence interweaving code and linkage information for streaming. Memory is divided into immutable memory (e.g., ROM), persistent memory (e.g., EEPROM), and transient memory (e.g., RAM). Only the latter two can be written from a program with access to the memory. Writing to persistent memory is much more expensive than changing data in transient memory. Writing several bytes, such as pages, in persistent memory is as expensive as writing single bytes. Cryptographic operations require transient memory to run. Transient memory is a scarce resource and heavily contested for by all application components executed on the resource-constrained system.

DESCRIPTION OF THE DRAWINGS

Examples of the invention are depicted in the drawings and described in detail below by way of example. It is shown in.

All the figures are for sake of clarity not shown in real dimensions, nor are the relations between the dimensions shown in a realistic scale.

DETAILED DESCRIPTION OF THE INVENTION

Figure 1:
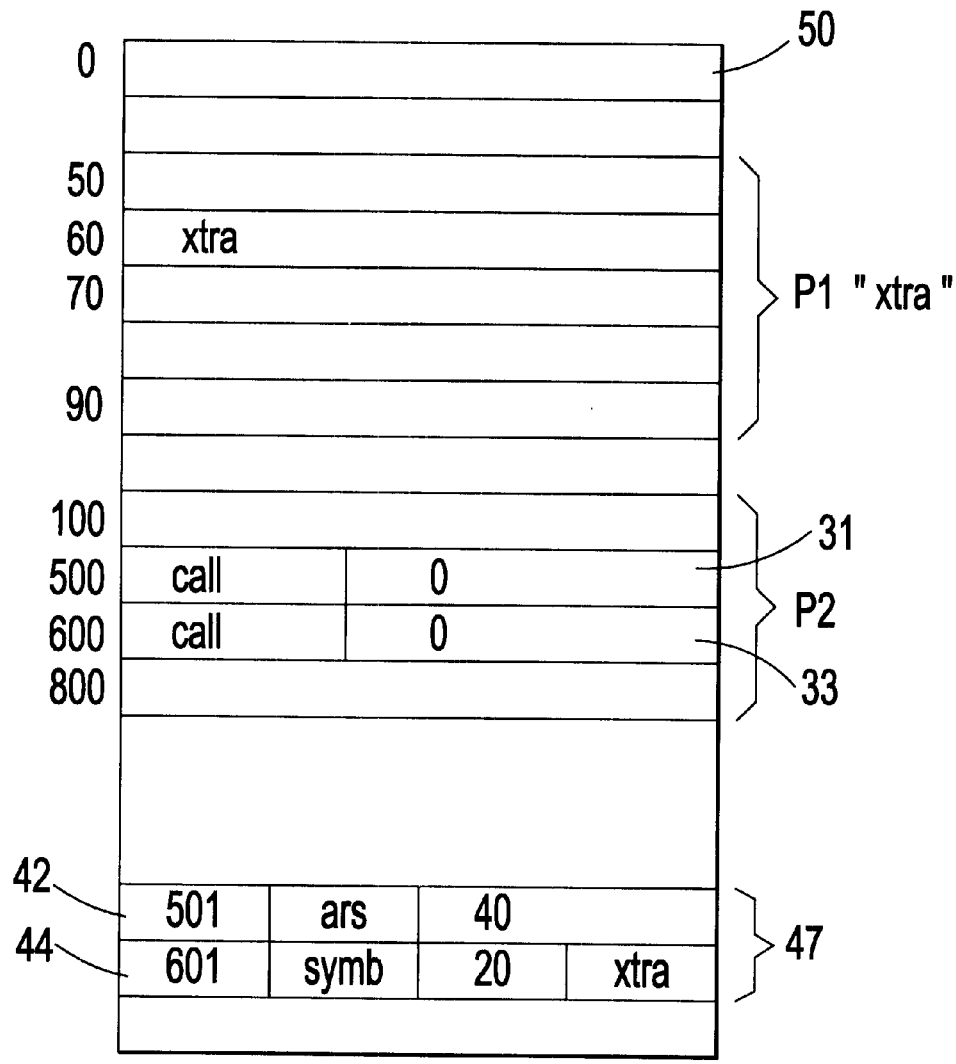
FIG. 1 an example of an instruction code sequence in an EEPROM according to the state of the art.
Figure 1:
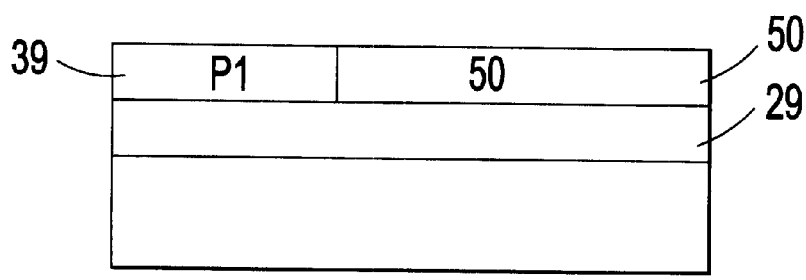

In the following, the various exemplary embodiments of the invention are described. In FIG. 1 an EEPROM 50 is depicted in which a first package P1 between addresses "50" and "90" is stored. The package has an AID "xtra" which is stored at an address "60". The first package P1 is already completely relocated.

A second package P2 between addresses 100 and 800 comprises a first instruction code 31 at an address 500 which instruction code 31 is a call code followed by a parameter which during loading is zero. The second package P2 further comprises a second instruction code 33 at an address 600 which instruction code 33 is a call code followed by a parameter which during loading is also zero.

The EEPROM 50 further is loaded with a relocation table 47 which comprises relocation information in the form of two relocation entries 42, 44. The first relocation entry 42 comprises a first fix-up information which points to the address place 501 where the address as parameter for the first instruction code 31 is to be put. It further comprises a relocation type identifier which here is abbreviated with "ars" for "anonymous-relocation-selfdirected". This identifier is followed by a relative address offset which is here 40. The second relocation entry 44 comprises a second fix-up information which points to the address place 601 where the address as parameter for the second instruction code 33 is to be put. It further comprises a relocation type identifier which here is abbreviated with "symb" for symbolic relocation.

This identifier is followed by a relative address offset which is here 20 and by an application id "xtra". A package list 29 comprises a list of all already linked packages, in this case for the first package P1 one entry which tells that the starting address of that package is "50".

According to the state of the art, on a smartcard, except for the application id table 29, all the above information is loaded into a RAM first and from there to the EEPROM. This is done due to the fact that on a smartcard the RAM is much smaller than the EEPROM. For linking, the whole above information is needed which leads to the obligation to have the whole information accessible at once. This can only be guaranteed for the EEPROM.

In the case where the code is encrypted, a decryption operation follows. For that, the code is piecewise reloaded to the RAM where a decryption is conducted and the decrypted code is reloaded to the EEPROM. In the case where an integrity check is to be done, the code is again piecewise reloaded to the RAM and the integrity check is performed, resulting in an integrity check vector, signaling if the code has passed the check or not.

Then follows the linking procedure which again can only be performed in the RAM. Hence, part of the relocation table 47 is read into the RAM and the linking procedure starts. The lining procedure goes through the relocation table 47 and starts with processing the first relocation entry 42. Due to the fact that the relocation type is selfdirected, the starting address is the starting address of the second package P2, i.e. the package which is currently loaded, i.e. "100". To this starting address the offset "40" given in the first relocation entry 42 is added, thereby arriving at a definitive determined address "140". This value is entered as the determined address in the address place 501 of the first instruction code 31.

Then the next relocation entry is processed. Due to the fact that the relocation type for the next entry is symbolic, the starting address is derived in that the entries in the package list 29 are checked one by one and each package is addressed for its therein stored AID and in the case of a matching AID the therewith identified package starting address is taken as the starting address for the determination of the address for the second instruction code 33. Since the first package P1 has the AID "xtra", it is recognized as being the right package. This operation results, therefore, in the starting address "50". To this starting address the offset "20" given in the second relocation entry 44 is added, thereby arriving at a definitive determined address "70" in the first package P1. This value is entered as the determined address in the address place of the second instruction code 33, since the address place pointed to by the second relocation entry 44 is 601.

Therewith the linking procedure is completed and the relocation table 47 and the package list 29 are no longer needed. The above procedure has various drawbacks: The large number of writing cycles to and from the EEPROM on one hand is time-consuming because EEPROMs have longer access times than RAMs and on the other hand, the lifetime of the system is reduced because the number of rewriting cycles of EEPROMs is limited.

Figures 2, 3:
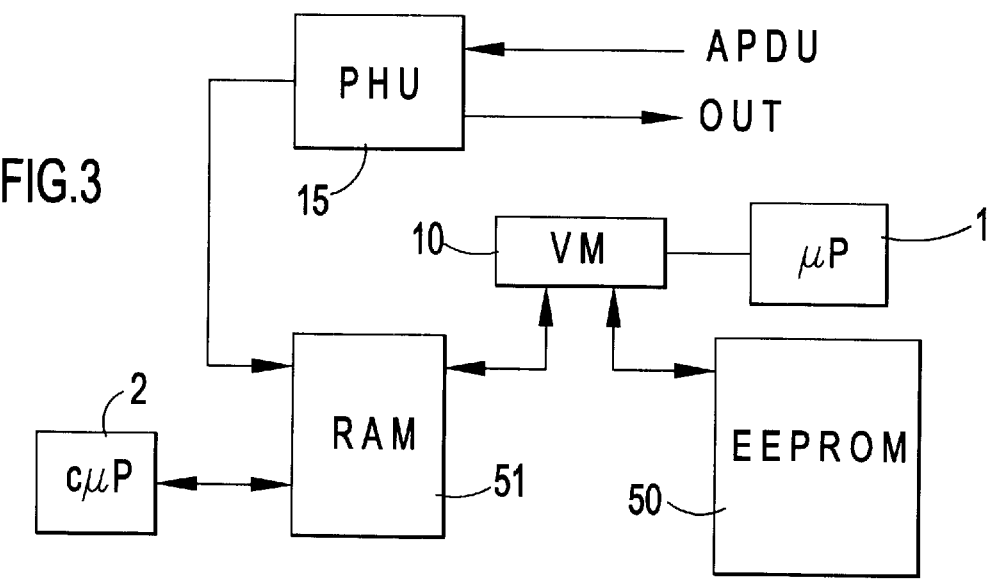
FIG. 2 a loading sequence of an instruction sequence interleaved with linking information and FIG. 3 an arrangement with a virtual machine, a RAM and an EEPROM.

In FIG. 2, the loading sequence of instruction codes and relocation information, also called load file, according to the invention is depicted. First, an application-id id list 27 is transferred which is preceded by an application-id id list length information 28, short naidid. The application-id id list 27 has three entries, a first application-id id aid1id, a second application-id id aid2id, and a third application-id id aid3id.

Then follows a first distinction information 37 in form of a code length information cl1. An incrementing instruction code "inc" with a parameter a follows, before the first address-parametered instruction code 31 "call" with a parameter os. Then follows already the first relocation information 35 which belongs to the first instruction code 31.

Next follows a second distinction information 38 in form of a code length information cl2. A decrementing instruction code "dec" with a parameter a follows, before the second address-parametered instruction code 33 "call" with a parameter os. Then follows already the second relocation information 36 which belongs to the second instruction code 31. Additionally to the load file so-called load-file meta information, such as code length, decryption key, MAC key a.s.o., can be loaded.

Hence, the relocation information list 47 no longer exists as a separate block but is split up and interwoven with the instruction code sequence. The fact that the relocation information 35, 36 is loaded directly behind its instruction code 31, 33, renders obsolete the address information, which in the liking procedure according to the state of the prior art was needed for pointing to the assigned address place. The assigned address place is here automatically recognized due to the fixed spatial relation between the place of the relocation information 35, 36 and place of the instruction code 31, 33. Hence, for each relocation step, two bytes are saved which reduces the amount of total bytes to be loaded and transferred between the memories.

Also, since the address places behind the instruction codes 31, 33 are not filled with zero values in the loading procedure but contain the values of the relative address offsets os, again two bytes per relocation information 35, 36 are saved. The system simply needs to know that the relative address offset os is to be found at the assigned address place and not behind the relocation information 35, 36. The selfdirected relocation type hence is reduced to a 1 byte relocation instruction 35.

The distinction information 37, 38 is used to enable a distinction between the instruction codes 30, 31, 32, 33 and the relocation information 35, 36. This is used to thereby detect which part of the code is the relocation information 35, 36 and is hence to be treated accordingly. The interleaving of the relocation information 35, 36 with the instruction code sequence is now used to relocate the address right after loading. The availability of the relocation information 35, 36 already before the whole loading sequence is loaded, renders possible an immediate relocation.

Immediate means here exemplarily, that the RAM 51 is either filled or that the end of the code sequence has been reached. Before relocation, an eventual decryption and/or integrity check can be done in the case, the code has been loaded in encrypted form and/or an integrity check is needed or desired. Such decryption can be done with a streamed cipher which makes the piece of code that fills the RAM 51 decryptable without relying on information only available from subsequent code.

Relocation is started which means that the first instruction code 31 is linked to the determined address and afterwards the respective relocation information 35 is obsolete and can be overwritten. This can be done by shifting the subsequent code upwards by the right number of bytes. Therefore, again, the code length information can be used which saves space in the EEPROM 50, Application-ids as defined by the ISO 7816 standard and commonly used in state of the art implementations of loading & linking new code on a JavaCard, are relatively long, i.e., between 5 and 15 bytes. The application-id id list 27 provides for a mechanism that reduces the required amount of both data storage during link time as well as that of data transmitted during the loading stage.

In order to facilitate these reductions, as a first stage in the loading process, the number of AIDs against which the following code is to be linked, is transmitted to the arrangement, e.g. a smartcard. Now the smartcard can allocate (transient) data storage for the same number of addresses as AIDs thus announced.

This data storage is subsequently filled with the start addresses of the different packages identified by said AIDs that are transmitted subsequently to the smartcard. The runtime environment therefor provides a method to look up the start addresses of the packages with the AIDs as received into the smartcard. The therefrom resulting start addresses are then entered into the AID-id table 27. In summary, the AIDs are thus only sent once to the smartcard in some predefined order which then is reflected in the AID-id table 27 thus established. This facilitates the use of only short (1 byte) AID ids, as opposed to the long 5–15 bytes AIDs, in any symbolic link information contained in the subsequently sent code and relocation information.

Since the encryption, integrity-check and linking can be performed piecewise, i.e. for only a part of the loaded code, one part following the other, all operations can be done right after loading the respective part to the RAM 51, followed by loading the decrypted, integrity-verified and linked code to the EEPROM. The reduced size of the RAM 51 is hence of lower impact on the loading and linking process.

Furthermore, a padding process can be introduced, i.e. filling up empty space in the RAM 51 with zero values in order to process only complete information comprising the address-parametered instruction code 31, 33 with the thereto belonging relocation information 35, 36. This is to avoid the necessity to intermediately store instruction codes whose relocation information did not fit into the RAM 51. If no relocation information is contained in the RAM 51 after one loading step which fills up the RAM 51, no linking is needed and the RAM 51 content can be transferred directly to the EEPROM 50.

In FIG. 3 an arrangement is depicted which is a resource-constrained environment such as particularly exists on smartcards. The restriction expresses itself mainly in the size of the RAM 51 and the EEPROM 50, but also in the small computing power which is relevant for cryptography; small bus width, which is relevant for intercommunication speed; and small clock cycles which leads to small inter-component communication speed and low processing speed, etc.

A microprocessor $\mu P1$ runs a virtual machine 10 which is connected to a first memory 51, which here is a memory with a short write-access time (e.g., here a RAM) and a second memory 50 which has a relatively longer write-access time (e.g., here an EEPROM). The RAM 51 is further connected to a coprocessor $c\mu P$ 2 and to a protocol-handling unit PHU 15 which handles APDU traffic arriving at and leaving the depicted arrangement which may be integrated on a smartcard.

Via the PHU 15, code is loaded in to the RAM 51. This code comprises the instruction code sequence and the relocation information 35, 36. In the prior art, the whole code sequence for an applet is loaded via the RAM 51 into the EEPROM 50. Only then, apart from eventual decryption and/or integrity-check, is the linking procedure performed.

The RAM 51 is smaller than the EEPROM 50, such that the code sequence can only piece-wise be transmitted to the EEPROM 50, each piece fitting into the RAM 51. With the herein described new method, each piece is linked completely before it is loaded into the EEPROM 50. With the overwriting feature, even less space in the EEPROM 50 is used which extends again its lifetime. The code loading between the memories 50, 51 should be done via a transaction-subsystem to ensure integrity of the EEPROM 50 in case of errors during the loading, linking and installation of new code on the smartcard. Decryption and integrity check is preferably done by the coprocessor $c\mu P$ 2, while the loading and linking is preferably done by the microprocessor $\mu P$ 1.

Instead of call instruction codes any other address-parametered instruction codes can be used. Other parameters, like the numbers of the addresses, are for sake of example only and can be varied without leaving the scope of the invention.

Having thus described the invention, what is claimed is:

1. In a method for loading instruction codes to memory and linking said instruction codes using linkage information, the improvement comprising interleaving code information and linkage information for streaming.

2. The improvement of claim 1 wherein said linking is done at a first memory having a short write-access time.

3. The improvement of claim 2 further comprising writing said instructions codes and linking information to a second memory after said linking.

4. A method for loading instruction codes to memory and linking said instruction codes, whereby at least one instruction code has an address parameter to be determined, the method comprising the steps of:

loading at least one instruction code to memory;

loading relocation information for said at least one instruction code to memory, wherein said at least one instruction code and said relocation information are interleaved; and performing a linking step comprising determining a value for said address parameter and appending said determined address parameter to an address location of said instruction code.

5. The method of claim 4 further comprising interleaving said at least one instruction code and said relocation information prior to loading.

6. The method of claim 4 wherein said determining said address comprises the steps of:

obtaining a starting address value;

obtaining a relative address offset value; and combining said starting address and said relative address offset values to arrive at said address.

7. The, method according to claim 5 further comprising supplying distinction information which enables distinguishing between instruction codes and relocation information.

8. The method according to claim 7 wherein said supplying distinction information comprises providing code length information to said interleaved instruction code and relocation information and wherein said supplying of code length information is conducted before loading.

9. The method of claim 6 wherein said relative address offset is located at said address location.

10. The method according to claim 6 wherein said starting address is derived from a directly addressable starting address list.

11. The method according to claim 4 wherein said appending comprises overwriting said relocation information.

12. The method according to claim 4 wherein said loading comprises loading to a first memory location and wherein said method further comprises the step of writing said instruction code and said determined address parameter to a second memory location.

13. The method of claim 12 wherein said first memory comprise a memory having a short write-access time and wherein said second memory location comprises a memory having a longer write-access time.

14. The method of claim 13 wherein said first memory comprises a random access memory and said second memory comprises an EEPROM.

15. The method of claim 12 wherein the instruction codes are loaded in an encrypted form and further comprising decrypting said information at said first memory location.

16. The method of claim 12 wherein said instruction codes are loaded with integrity check information and wherein said method further comprises checking the integrity of said codes in said first memory location.

17. A device for providing loading of instruction codes comprising:

a first memory location;

loading means for loading to said first memory location at least one instruction code interleaved with relocation information pertaining to said at least one instruction code; and linking means for linking said instruction codes using said relocation information.

18. The device of claim 17 wherein said first memory location comprises a short write-access time device.

19. The device of claim 18 wherein said first memory comprises a random access memory.

20. The device of claim 17 further comprising a second memory a longer write-access-time than said first memory.

21. The device of claim 20 wherein said second memory comprises an EEPROM.

22. The device of claim 17 wherein said first memory device further comprises at least one decryption component for decrypting the instruction codes which are loaded in an encrypted form.

23. The device of claim 17 wherein said first memory device further comprises at least integrity-checking means for checking the integrity of at least said instruction codes which are loaded with integrity check information.

24. The device of claim 17, characterized in that it comprises a smartcard.

25. A program storage device readable by machine, tangibly embodying a program of instructions executable by the machine to perform method steps for loading instruction codes to memory and linking said instruction codes, whereby at least one instruction code has an address parameter to be determined, the method steps comprising:

loading at least one instruction code to memory;

loading relocation information for said at least one instruction code to memory, wherein said at least one instruction code and said relocation information are interleaved; and performing a linking step comprising determining a value for said address parameter and appending said determined address parameter to an address location of said instruction code.

* * * * *